(12) United States Patent
Hentz et al.

(10) Patent No.: US 8,136,401 B2
(45) Date of Patent: Mar. 20, 2012

(54) RESONANT-BEAM ACCELEROMETER WITH ROTATING ARTICULATED LEVER ARM

(75) Inventors: Sébastien Hentz, Grenoble (FR); Valérie Nguyen, Varces (FR); Philippe Robert, Grenoble (FR)

(73) Assignee: Commissariat A l'Energie Atomique, Paris (FR)

( * ) Notice: Subject to any disclaimer, the term of this patent is extended or adjusted under 35 U.S.C. 154(b) by 455 days.

(21) Appl. No.: 12/440,945

(22) PCT Filed: Sep. 17, 2007

(86) PCT No.: PCT/EP2007/059763
§ 371 (c)(1),
(2), (4) Date: Apr. 9, 2009

(87) PCT Pub. No.: WO2008/034788
PCT Pub. Date: Mar. 27, 2008

(65) Prior Publication Data
US 2010/0000323 A1 Jan. 7, 2010

(30) Foreign Application Priority Data
Sep. 19, 2006 (FR) .................................... 06 08186

(51) Int. Cl.
*G01P 15/10* (2006.01)
(52) U.S. Cl. .................................................. 73/514.29
(58) Field of Classification Search ........................ None
See application file for complete search history.

(56) References Cited

U.S. PATENT DOCUMENTS

| 5,969,249 | A | 10/1999 | Roessig et al. |
| 6,941,809 | B2 | 9/2005 | Le Roy et al. |
| 7,124,633 | B2 * | 10/2006 | Quer et al. ............. 73/514.15 |
| 2009/0139342 | A1 * | 6/2009 | Robert et al. ............. 73/818 |

FOREIGN PATENT DOCUMENTS

| EP | 0331557 A1 | 9/1989 |
| FR | 2784752 A1 | 4/2000 |
| FR | 2821433 A1 | 8/2002 |
| FR | 2848298 A1 | 6/2004 |
| WO | 9853328 A1 | 11/1998 |

OTHER PUBLICATIONS

Young Ho Seo and Young-Ho Cho: Design, Fabrication, Static Test and Uncertainty Analysis of a Resonant Microaccelerometer, in Sensors and Materials, vol. 14, No. 2 (2002), pp. 97-108.
O. Le Traon et al.: The Via Vibrating Beam Accelerometer: A New Quartz Micromachined Sensor, in 1999 Joint Meeting EFTF-IEEE IFCS, pp. 1041-1044.

(Continued)

*Primary Examiner* — Harshad Patel
(74) *Attorney, Agent, or Firm* — Lowe Hauptman Ham & Berner, LLP

(57) ABSTRACT

The invention relates to a micromachined accelerometer using a movable seismic mass suspended in relation to the substrate by elastic connections only allowing translation in its own plane along a sensitive axis (Oy). The mass acts on at least one elongate resonator by means of a force amplification structure associated with this resonator. The amplification structure comprises a rigid lever arm, a first end of which is connected to the seismic mass by a connection having, in the plane of the mass, a high stiffness in the direction of the sensitive axis (Oy) and a low stiffness in the perpendicular direction, and a second end is connected to an anchor point on the substrate. The second end of the lever arm is a rigid head piece surrounding the anchor point and connected to this anchor point by a rotational connection about a center of rotation. The resonator has one end fixed to the rigid head piece at a point such that the longitudinal axis of the resonator passes a distance h, small in relation to the length L of the lever arm but nonzero, from the center of rotation of the rotational connection.

21 Claims, 3 Drawing Sheets

OTHER PUBLICATIONS

M. Aikele et al.: Resonant Accelerometers with Self-Test, in Sensors and Actuators A 92 (2001), pp. 161-167.

Peter H. Lafond: Modeling for Error Reduction in Vibrating Beam Accelerometers, in IEEE 1992, Position Location and Navigation Symposuim, pp. 126-132.

Roessig et al.: Surface Micromachined Resonant Accelerometer, in Transducers 97 IEEE, pp. 859-862.

Ashwin A. Seshia et al.: A Vacuum Package Surface Micromachined Resonant Accelerometer, in Journal of Microelectromechanical systems, vol. 11, No. 6, Dec. 2002.

* cited by examiner

RESONANT-BEAM ACCELEROMETER WITH ROTATING ARTICULATED LEVER ARM

CROSS-REFERENCE TO RELATED APPLICATIONS

The present Application is based on International Application No. PCT/EP2007/059763, filed on Sep. 17, 2007, which in turn corresponds to French Application No. 0608186 filed on Sep. 19, 2006, and priority is hereby claimed under 35 USC §119 based on these applications. Each of these applications are hereby incorporated by reference in their entirety into the present application.

FIELD OF THE INVENTION

The invention relates to accelerometers that are micromachined in a wafer of monolithic material according to mass fabrication technologies similar to those used in the mass fabrication of electronic integrated circuits.

These accelerometers have multiple applications, notably in fields in which a minimum size and a low production cost are sought simultaneously. A privileged field of application is the field of automobile or air navigation, in which these accelerometers allow determination of a speed then a trajectory by integrating the signals that they provide.

BACKGROUND OF THE INVENTION

A number of characteristics are expected of an accelerometer, principally a low size requirement, good sensitivity to an acceleration in a well-identified direction called the "sensitive axis", a sensitivity as low as possible along the other axes, good linearity, good measurement precision, good mechanical strength, and low cost.

The mass fabrication technologies used in microelectronics are particularly suited to obtaining a low production cost and the cost is then directly linked to the size of the micromachined component. Depending on the application envisaged for the accelerometer, optimization of the various characteristics above will be attempted and the necessary compromises will be made, for example a compromise between small size and good sensitivity.

A micromachined accelerometer generally comprises a movable seismic mass (or proof mass) connected to a substrate in which it has been machined by an elastic connection. A resonant or vibrating beam (or several such) is fixed between the mass and the fixed substrate and undergoes directly or indirectly, possibly even with mechanical amplification, the forces connected with the movement of the seismic mass during an acceleration. The beam is vibrationally excited (for example through the effect of electrostatic forces between opposite conductive zones) by an electrical excitation circuit; the excitation circuit is an oscillating circuit which the electrically conductive beam is part of. The beam behaves like a movable capacitor plate undergoing electrostatic forces and causing variations in capacitance. The electrical oscillation frequency that is established in such a circuit is a mechanical resonant frequency of the beam. This frequency depends on the tension (or the compression) of the beam in the longitudinal direction; this tension results from the force exerted by the seismic mass, hence from the acceleration undergone by the mass. Measurement of the frequency of electrical oscillation enables the acceleration undergone by the mass to be determined.

The oscillation frequency f is of the form $f=f_0(1+P/Pc)^{1/2}$, where $f_0$ is a natural oscillation frequency in the absence of tensile or compressive stress, P is the tension exerted on the beam (signed, i.e. a tension or a compression according to whether P is positive or negative), Pc is a fixed value linked to the geometry of the beam and to the material constituting it.

In the prior art many constitutions of accelerometer have been proposed. The following may notably be cited:

Pendulous accelerometers in which the mass rotates about a hinge that connects it to the substrate.

These accelerometers are not generally high performance for small accelerations, particularly if there are several resonant beams, due to mechanical couplings between the beams. In addition, the rotations carried out during the movement of the mass have the effect that the forces exerted by the mass on the resonant beam are not exactly on the axis of the beam; this results in interference force components and a poor use of the energy of movement applied by the mass to the beam: part of the energy is used to deform the beam by bending, which is not expedient to the measurement; linearity and sensitivity are not optimum.

Some structures locate the resonator in such a way that the axis of the beam is parallel to the sensitive axis and perpendicular to the line that connects the point of rotation of the mass and the point of application of the force on the beam. However, this often results in an unfavorable arrangement from the point of view of compactness and there are difficulties with industrial production.

Such accelerometers are described, for example, in the following publications:

EP 0 331 557 B1, U.S. Pat. No. 6,941,809 B2, FR 2 784 752 A1, WO 98/53328 A1;

Young Ho Seo and Young-Ho Cho: Design, Fabrication, Static Test and Uncertainty Analysis of a Resonant Microaccelerometer, in Sensors and Materials, vol. 14, no. 2 (2002), pp. 91-108;

O. Le Traon et al.: The Via Vibrating Beam Accelerometer: A New Quartz Micromachined Sensor, in 1999 Joint Meeting EFTF-IEEE IFCS, pp. 1041-1044;

M. Aikele et al.: Resonant Accelerometers with Self-Test, in Sensors and Actuators A 92 (2001), pp. 161-167;

Peter H. Lafond: Modeling for Error Reduction in Vibrating Beam Accelerometers, in IEEE 1992, Position Location and Navigation Symposium, pp. 126-132;

Roessig et al.: Surface Micromachined Resonant Accelerometer, in Transducers 97 IEEE, pp. 859-862.

So as to make up for the kinematic errors of the oscillating structures other structures have also been proposed in which the seismic mass moves parallel to itself (therefore in translation and not in rotation about a hinge). The resonator is then most often connected directly to the mass, which prevents an amplification effect on the force due to the acceleration being obtained. Sensitivity is therefore limited. These structures are in general bulky, especially when differential operation with two resonant beams is desired (one beam being subjected to a tensile force while the other is subjected to a compressive force).

Other structures with translational movement of the mass have been proposed with an amplification structure placed between the mass and the resonant beam. This amplification structure comprises a force amplification lever. The force exerted by the mass on the lever at one point is transmitted with an amplification factor to another point of the lever. These structures are complex: they further require an intermediate part and an articulation between the lever and the resonant beam. They are bulky, particularly if they must operate differentially with two resonant beams working, one under tension the other under compression, during a movement of the seismic mass.

Such accelerometers, provided with mechanical force amplification means are described, for example, in the following publications:

FR 2 848 298 A1: this structure has a force amplification factor linked to the value of the tangent of an angle which is difficult to control precisely in industrial fabrication.

U.S. Pat. No. 5,969,249 and the article by Ashwin A. Seshia et al.: A Vacuum Packaged Surface Micromachined Resonant Accelerometer, in Journal of Microelectromechanical systems, vol. 11, no. 6, December 2002. This structure has a lever amplification effect, but it is particularly bulky and the articulation of the levers to the substrate is necessarily fairly rigid because there is not enough room to put in a more flexible articulation without further increasing the size requirement.

The accelerometers that will be considered here are resonant accelerometers having a seismic mass capable of moving mainly in translation along a sensitive axis lying in the plane of the substrate in which the mass is machined (in contrast to other accelerometers in which the sensitive axis is perpendicular to the plane of the substrate). It will be assumed in the following that the geometry of the accelerometer is defined in an orthogonal reference frame Ox, Oy, Oz specific to the accelerometer; the axis Oy, in the plane of the substrate, is the sensitive axis; the axis Ox, also in the plane of the substrate, is perpendicular to Oy; the axis Oz is perpendicular to the plane.

In these accelerometers the seismic mass is suspended from anchor points fixed in relation to the substrate by means of elastic connections having a low stiffness in the direction of the sensitive axis Oy and a high stiffness along the two other axes Ox and Oz. It can therefore only move, practically, in the Oy axis. Its movement is limited within the range of accelerations to be measured by the return force exerted by the elastic connections.

The seismic mass is connected through a force amplification structure to a resonator on which it exerts a tension or a compression. The resonator is in general a simple resonant beam or an assembly of two parallel, mechanically coupled, resonant beams (tuning-fork resonator). It is also micromachined in the substrate and in general has one end anchored in the substrate. The mechanical connection between the mass and the beam is such that the movements of the mass along Oy exert a tension or a compression on the beam in the longitudinal direction of the beam. The resonator is associated with means for exciting a vibration and with means for measuring the resultant vibration frequency.

SUMMARY OF THE INVENTION

In order to reach a better compromise between compactness, sensitivity and the other qualities desired for an accelerometer, the invention proposes a novel accelerometer structure.

According to the invention, a micromachined accelerometer is proposed using a movable seismic mass suspended in relation to the substrate by elastic connections principally allowing translation in its own plane along a sensitive axis (Oy), the mass acting on at least one elongate resonator by means of a force amplification structure associated with this resonator, the amplification structure comprising a rigid lever arm, a first end of which is connected to the seismic mass by a connection having, in the plane of the mass, a high stiffness in the direction of the sensitive axis (Oy) and a low stiffness in the perpendicular direction, and a second end of which is connected to an anchor point on the substrate, the accelerometer being characterized in that the second end of the lever arm is a rigid piece connected to the anchor point by a purely rotational connection, the resonator having one end fixed to the rigid head piece at a point such that the longitudinal axis of the resonator passes a distance h, small in relation to the length L of the lever arm but nonzero, from the center of rotation of the rotational connection.

'Distance h, small in relation to the length L' is understood to mean that the ratio L/h is large enough for there to be a force amplification, i.e. for the force exerted by the lever on the resonator to be greater than the force exerted by the mass on the lever. L/h is preferably equal to at least 10. Thanks to this construction it is possible to choose the position and orientation of resonators in any way, and thus to optimize the structure from the point of view of the space requirement, while having a significant amplification of the force exerted by the mass. In previous devices that use a rotationally articulated amplification lever, the resonators were in principle aligned with each other on both sides of the seismic mass. This arrangement was very disadvantageous from the point of view of the size requirement.

It is possible in particular, thanks to the invention, to arrange the resonator(s) along one side of the seismic mass and in immediate proximity to this side in order to minimize the space requirement. The lever arm may also be placed along one side of the seismic mass, and in this case it is along a side perpendicular to the sensitive axis. With a lever arm adjacent one side of the mass and a resonator also adjacent one side of the mass, a considerable space-requirement gain is made in relation to amplification structures of the prior art.

The resonator may be a simple elongate resonant beam. It may also be a tuning-fork resonator consisting of two symmetric parallel beams whose ends are joined. The longitudinal axis of the resonator, passing a distance h from the center of rotation of the lever, will then be considered to be the straight line parallel to the beams, hence passing between the beams an equal distance from them.

The rigid head preferably at least partly surrounds the anchor point of the second end of the lever arm. It is preferably connected to this anchor point by two perpendicular flexible bending arms, each having one end connected to the anchor point. The ends connected to the anchor point are very close to one another so that the flexible bending arms are practically able to turn about the same point, which will be called the center of rotation of the lever, situated at the intersection of the straight lines defined by the directions of the two bending arms. The rigid head consists of a closed frame or a partly open frame surrounding the anchor point and it is to this frame that the bending arms may be fixed. The frame may be of rectangular shape, and more precisely square.

Thanks to this rigid head piece at the end of the lever which surrounds the anchor point of the rotational connection of the lever, it is possible to straightforwardly produce a more flexible rotational connection than in the prior art, the flexibility being connected with the fact that the flexible connecting arms which connect the head piece to the anchor point can be fairly long without hindering their construction. The rigid head is in principle placed at the side of the seismic mass and not in the middle of a side, except in a particular case.

The point of attachment of the resonator on the rigid head piece is preferably situated in a location such that the angle formed between the line that connects the attachment point to the center of rotation, on the one hand, and the longitudinal direction of the resonator, on the other hand, is close (preferably as close as possible) to 90°.

The resonator has, in principle, another end fixed to the substrate. However, it may also have this other end fixed to a second identical, symmetrical lever arm, so that the two lever arms pull at the same time on each side of the resonator or push at the same time on each side of the resonator. The configuration is therefore preferably the following: the two lever arms are symmetric in relation to the Oy axis, passing through the center of gravity of the seismic mass; they are arranged in line with each other along one edge of the seismic mass, the first ends (those which actuate the lever) being connected to the seismic mass by a respective flexible connection close to the middle of the edge of the mass. The resonator is positioned parallel to the two arms.

The lever arm is therefore not necessarily single, i.e. there may be two lever arms per resonator.

Generally speaking, a symmetric differential structure will be preferred, with two resonators being subjected to opposing forces (tension and compression respectively) for the same movement of the seismic mass. In this case, one lever arm on one side of the mass (for example, along an edge perpendicular to the sensitive axis Oy) and another lever arm on the other side of the mass (for example, along the edge opposite the mass) will in principle be provided. The preferred structure then comprises at least two resonators arranged symmetrically in relation to the center of gravity of the seismic mass, and two force amplification structures, each associated with a respective resonator and symmetric in relation to the center of gravity.

Still other objects and advantages of the present invention will become readily apparent to those skilled in the art from the following detailed description, wherein the preferred embodiments of the invention are shown and described, simply by of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
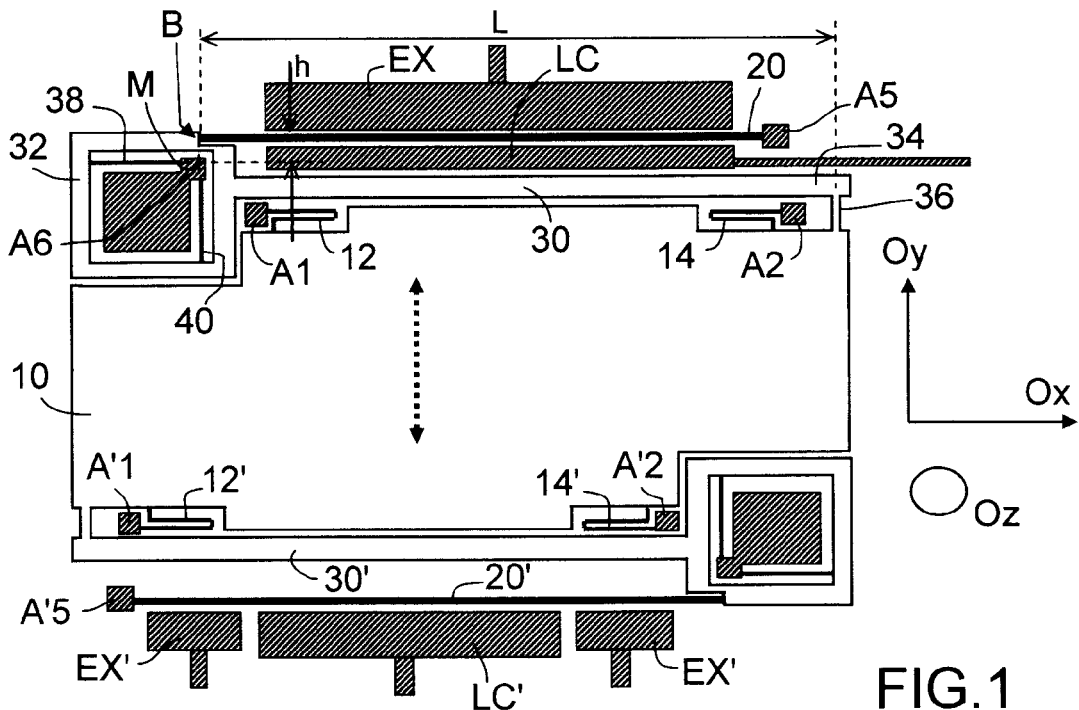
FIG. 1 shows a plan view of the general structure of the micromachined accelerometer according to the invention, in which the rigid frame constituting the head of the lever comprises a recess at the place of attachment to the resonator.

The general structure of the accelerometer according to the invention is shown in FIG. 1. Hatched areas represent the parts which are fixed, that is, which are directly part of the substrate into which the structure has been micromachined. These areas constitute anchor points in relation to which other parts of the structure are suspended.

The movable seismic mass is denoted by the reference 10. It is suspended from the substrate by flexible elastic connections effectively having a single degree of freedom, translational along the Oy axis. The Oy axis is the sensitive axis of the accelerometer. Of course, in reality the flexible elastic connections are not perfectly rigid along the other axes so that movements according to other translational or rotational degrees of freedom remain possible, but they are negligible compared with the movement along Oy so that it is possible to assume, to simplify matters, that there is only one degree of translational freedom along Oy.

To attain this result, it is possible for example, as shown in FIG. 1, to provide four anchor points A1, A2, A'1, A'2 distributed around the seismic mass, and a respective U-shaped elastic correcting arm with two elongate branches for connecting the mass to each of these points. These U-shaped connecting arms with elongate branches, denoted 12, 14, 12', 14' have a high stiffness in the direction of elongation of the U and a low stiffness perpendicular to the elongation of the U.

This is why they only allow movement in the latter direction. The elongate branches of the U are therefore directed along the Ox axis, perpendicular to Oy in the plane of the substrate. The arms are also stiff enough in the Oz direction to not allow movements of the mass in the Oz direction.

Other solutions for allowing a translational movement along Oy alone may be used, for example through one or more anchor points situated in the central part of the seismic mass (surrounded by the seismic mass) and elastic connecting arms extended in the Ox direction between the mass and this or these point(s).

The structure also comprises a resonator and a force amplification structure associated with the resonator in order to transmit to the resonator an acceleration force undergone by the mass with an amplification effect. As is shown in FIG. 1, the structure of the accelerometer is preferably symmetric in the sense that there are two resonators 20 and 20' subjected to forces in contrary directions during the same movement of the mass and a respective amplification structure associated with each of these resonators.

In FIG. 1, the resonators 20 and 20' each consist of a single resonant beam having one end connected to a fixed anchor point (A5 and A'5 respectively) and another end connected to the respective force amplification structure.

The force amplification structure associated with the resonator 20 comprises a lever arm 30 having a first end or actuating end 34 connected to the rigid mass and a second end consisting of a rigid head piece (here a square frame 32). The connection 36 between the first end of the lever arm and the seismic mass is such that this end is pulled or pushed by the mass when it undergoes an acceleration along its sensitive axis. In addition, this connection is elastic in the direction perpendicular to Oy so that the pushed or pulled lever arm is able to preserve a degree of rotational freedom. In FIG. 1 the connection 36 between the seismic mass and the first end of the lever arm is a flexible straight arm elongated in the Oy direction, and therefore capable of bending in the Ox direction. This flexible arm has a point of attachment to the mass, located in the vicinity of a corner of the seismic mass (i.e. a point distant from an axis parallel to Oy and passing through the center of gravity of the mass).

The second end of the lever, consisting overall of the rigid square frame 32, is connected to the substrate by a flexible connection essentially having a single degree of freedom of movement, which is a degree of planar rotational freedom about a fixed center of rotation M; the lever is able to turn only in the plane of the substrate about the center of rotation. In the embodiment of FIG. 1 the square frame 32 totally surrounds the center of rotation M, but it will be seen that it might also surround it only partially.

The lever arm 30 may thus be pushed or pulled by the mass acting on its first end 34 and can only turn about the center M and it is sufficiently rigid so as not to deform significantly, notably by bending. The high flexibility, along Ox but not along Oy, of the flexible arm 36 allows this pure rotational movement, i.e. pure or almost pure taking account of possible second-order interference movements, as the stiffnesses of the connections considered as having high stiffness cannot be infinite, no more than high rigidness can be infinite. This pure rotation is possible despite the fact that the actuation of the end 34 of the arm is carried out along the Oy axis.

The elongate resonator 20 that is shown in FIG. 1 has a first end attached to the rigid square 32 at an attachment point that allows the frame to exert a longitudinal force on the resonator when the lever arm turns about the center M, this force being greater, due to the lever arm, than the force exerted by the mass on the lever arm. The second end of the resonator is, as has been said, attached to the anchor point A5.

The resonator is considered to have a longitudinal axis which is a straight line pointing in the direction of elongation of the resonator and passing through an axis of symmetry thereof: if it is a simple resonant beam of short length, the axis is practically constituted by the beam itself; if it is a double beam (tuning-fork resonator with two parallel beams), the axis is a straight line parallel to the beams and passing between the beams in the middle of the gap that separates them.

Whatever the constitution of the resonator, it is positioned so that its axis passes a distance h from the center of rotation M, the distance h being small compared with the length L of the lever arm 30. The length of the lever arm is understood to be the distance that separates the point of attachment of the mass to the lever arm from the center of rotation M. The ratio L/h is preferably equal to at least 10.

In the example of FIG. 1, the lever arm is elongate in the Ox direction, perpendicular to the sensitive axis, and the center of rotation M is situated close to the longitudinal axis of the lever arm. It is not necessary for this axis to pass exactly through the center of rotation M.

If the point of attachment of the resonator on the rigid frame 32 at the end of the lever arm is called B, it is desirable for the point B to be situated at a location such that the angle formed between the line BM, which connects the point of attachment B to the center of rotation M, on the one hand, and the longitudinal direction of the resonator (Ox in FIG. 1), on the other hand, is as close as possible to 90°. This makes it possible for the resonant beam to be subjected to forces only in the direction of its elongation. It is in fact pointless for it to be subjected to a bending moment at its ends, perpendicular to its own longitudinal direction. If the attachment point B is located at a place so that the angle α is different from 90°, the structure operates with a beam bending component and with a reduced force amplification effect (in the direction of the tension or of the longitudinal compression) due to this angle. The amplification factor between the force applied by the mass and the longitudinal compression or tension force is in fact roughly of the form (L/h). Practical considerations of fabrication may necessitate the angle α being different from 90°. If it is not possible to use an angle close to 90° (as will be seen further on with regard to FIG. 3), it may be desirable to increase the ratio L/h if it is desired to preserve an amplification ratio of at least 10.

In the case of FIG. 1, an attachment point B has been constituted on this line at 90° to the axis of the beam by making a cut-out in the rigid frame which in addition preferably has a constant section all around the center of rotation M. It will be seen that it is also possible to cut out the rigid frame at this location in order to produce this attachment point by minimizing the height h or, on the contrary, if it is undesirable to risk decreasing the rigidity of the frame 32 through a cut-out or a recess, it will be seen that it is also possible to provide a protrusion on the rigid frame or other more complex shapes.

The pure rotational connection between the rigid head piece (frame 32) and the substrate is preferably produced in the following manner: the center of rotation M is situated over an anchor area A6 of the substrate. Two simple flexible arms 38 and 40 leave from approximately the same attachment point on this anchor area (or from two closely neighboring points as close as possible to the desired position for the center of rotation M). The flexible arms 38 and 40 extend in different directions (preferably orthogonal, for example one along Ox and the other along Oy) between their point of attachment to the anchor area A6 and a point of attachment inside the rigid frame. The frame has a sufficient internal size for the arms 38 and 40 to be able to have an elongation that gives them low stiffness in the direction perpendicular to this elongation. The arms have a stiffness $k_x$ in the direction of their elongation which is much greater than the bending stiffness $k_y$: $k_x/k_y$ is approximately equal to $[L_p/w_p]^2$, where $L_p$ and $w_p$ are the length and the width respectively of the arms. Thanks to this construction, a pure or almost pure rotational connection of low stiffness is produced, which was hardly conceivable with the structures of the prior art (instead using very short hinges). Even if this connection is relatively bulky due to the size of the arms 38 and 40 and of the rigid frame 32, it leaves the possibility of locating the resonant beam very close to the seismic mass and the overall size requirement of the seismic mass can be reduced.

The preferred structure of the invention is a symmetric structure and then comprises, as seen in FIG. 1, a second resonator 20', a second lever arm 30' turned in the opposite direction and actuated from a point of the mass that is diagonally opposite the actuation point of the lever arm 30. More generally, all the elements of the mass, of the lever arm and of the resonator located on one side of the mass are symmetric with the corresponding elements of the other side, the symmetry being in relation to the center of gravity of the seismic mass.

The resonators are conventional and a vibrating beam has principally been shown, but the complete resonator of course comprises vibration excitation elements and elements for reading the vibration frequency of the beam. These elements are shown in a purely symbolic form in FIG. 1: the excitation elements EX may be situated all along the beam, on one side thereof, with the reading elements LC on the other side of the beam. This is what is shown at the top of the figure. But other arrangements may also be provided, such as, for example, excitation elements EX' at the ends of the beam and reading elements LC' in the vicinity of the central part of the beam.

This is what is shown at the bottom of FIG. 1. In an industrial embodiment, the excitation and reading elements would be arranged in the same way but symmetrically at the top and at the bottom of the figure, and the representation of different elements in FIG. 1 has the sole object of allowing it to be understood that there are several possible arrangements for these elements.

The excitation and reading elements have not been represented in the other figures so as not to overload the drawing.

It should be noted that although the anchor point A6 is situated as close as possible to the point B of attachment of the resonant beam, hence very close to an internal edge of the rigid frame 32, the general form of the anchor point A6 may occupy almost all the space available inside this frame, with the exception of the part occupied by the flexible connecting arms 38 and 40. In addition, the anchor points A1 and A2 may constitute a stop for the mass, limiting the risks of breakage in the case of inopportune movements due to impacts. Other stops, not shown, may incidentally also be provided.

Figure 2:
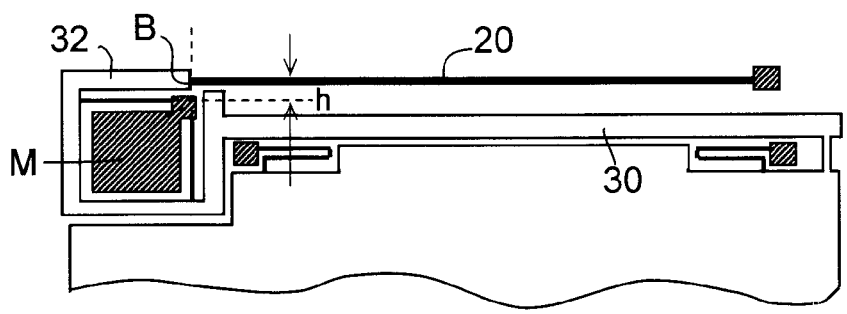
FIG. 2 shows a variant embodiment in which the rigid head is a frame cut out at the place of attachment to the resonator.

FIG. 2 shows a possible variant embodiment of the rigid head piece in which the rigid frame 32 is cut out to further reduce the height h without preventing the hanging of the resonant beam at a point B situated on a radius of rotation at 90° to the direction of the beam.

Figure 3:
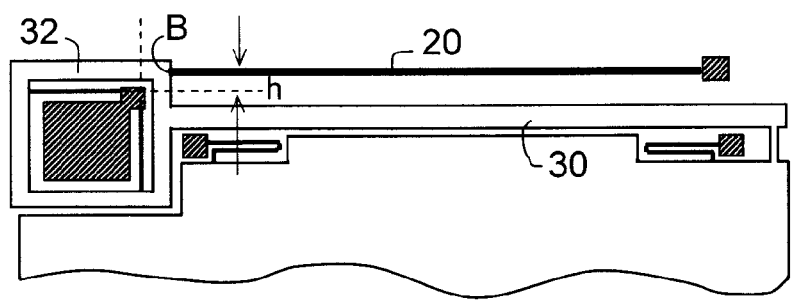
FIG. 3 shows a variant embodiment in which the rigid frame is closed and without a recess.

FIG. 3 shows another variant in which the frame 32 has neither a recess nor a cut-out in order to ensure better rigidity of the frame 32, but in which the point of attachment of the resonant beam is not situated on a radius of rotation at 90° to the axis of the beam, which has the effect of reducing the force amplification factor.

Figure 4:
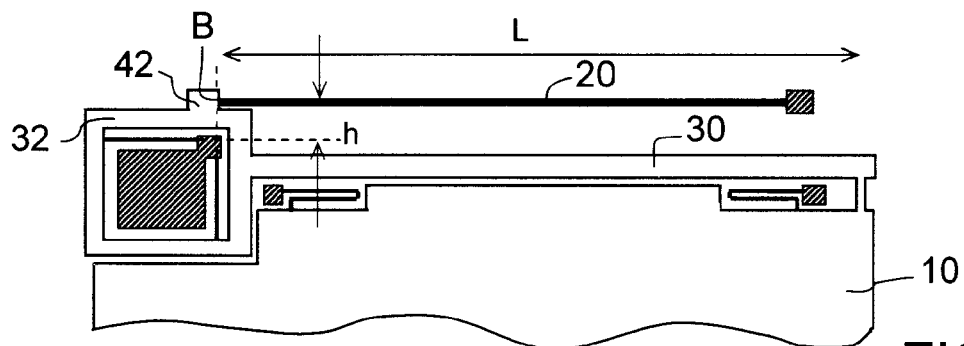
FIG. 4 shows an embodiment in which the frame has a protrusion at the place of attachment to the resonator.

FIG. 4 shows a variant in which the frame 32 has a constant section but has a protrusion 42 allowing the resonator to be attached on a radius of rotation at 90° to the axis of the beam without weakening the rigidity of the frame. This arrangement tends, however, to increase the distance h and therefore to reduce the force amplification factor of the lever arm.

Figure 5:
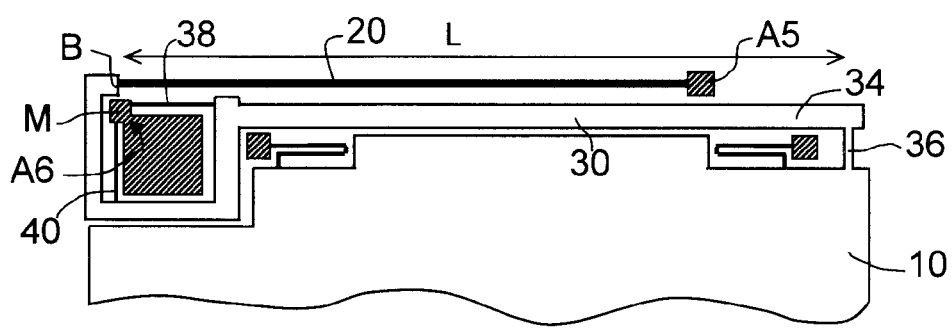
FIG. 5 shows an embodiment in which the length of the lever arm is increased in relation to that of the previous figures.

FIG. 5 shows a variant in which the fixed center of rotation M is located differently inside the rigid frame 32. It is located more externally that in FIGS. 1 to 4, which allows the length L of the lever arm to be increased without changing the overall space requirement. In practice, in the same way as the center of rotation might, in the case of FIGS. 1 to 4, be very close to a right inside edge of the frame 32 (closest to the actuation end 34 of the lever), it is now very close to a left inside edge of the frame 32 (furthest from the end 34). The rigid frame 32 remains connected to an anchor area A6 by two longitudinal flexible arms, preferably perpendicular to each other, which meet this anchor area at two points very close to each other so as to constitute a center of rotation M at the intersection of the longitudinal axes 38 and 40 of the two arms. In this embodiment, it is necessary to cut out a larger portion of the rigid frame if the arrangement with the cut-out frame of FIG. 2 is adopted. The other arrangements of the frame (recess, protrusion) are, however, also possible.

It will consequently be understood that the particular feature in FIG. 5 is that there is a connecting arm (38) between the end 34 of the lever arm 30 and the center of rotation M, whereas in FIGS. 1 to 4 it is the center of rotation M that is situated between the connecting arm (38) and the end 34 of the lever arm 30.

Figure 6:
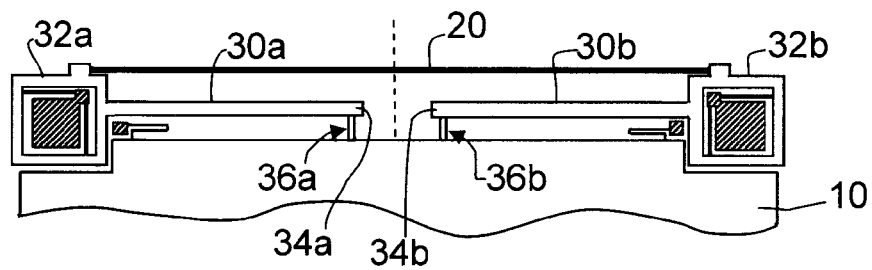
FIG. 6 shows an embodiment in which the resonator is attached between the ends of two symmetric lever arms acting simultaneously in tension or in compression.

FIG. 6 shows a variant embodiment in which a symmetry is established in relation to a vertical axis (parallel to the sensitive axis Oy) passing through the center of gravity of the mass. The structure has two levers 30a and 30b in line with each other along one edge of the mass (parallel to Ox). They are pulled or pushed along the same direction by the mass, but oriented in the opposite direction so that they turn in an opposite direction, and the resonator is hung at the ends 32a, 32b (rigid square frames) of the two levers. When the mass moves in one direction, the two levers each pull on an end of the resonator; when it moves in the other direction, the two levers push the two ends of the resonator towards one another. And the forces are reversed for the two levers situated on the other side of the seismic mass, the symmetry being both in relation to a central axis parallel to Ox and in relation to a central axis parallel to Oy. It is important to observe that in this case, the resonator is not anchored to the substrate by one end. In this configuration the ends 34a, 34b of the two symmetric levers are independent and each connected to the center of the upper edge of the seismic mass by a respective flexible connecting arm 36a, 36b (elongate and stiff in the direction of the sensitive axis Oy and capable of flexibility along the axis Ox).

The structure shown in FIG. 6 corresponds to the case in which a protrusion is formed on each of the rigid frames in order to define the attachment point for the resonator. However, it is of course also possible to conceive of a frame provided with a recess as in FIG. 1 or a cut-out as in FIG. 2 or attached to a point not lying on a radius at 90° to the axis of the beam as in FIG. 3. It is also possible to conceive that the center of rotation of each lever is positioned as in FIG. 5 rather than as in FIG. 4 so as to increase the effective length L of the lever arms. The lever arms in fact have half the length of that of the previous figures and it is useful to take advantage of all possibilities for increasing their length.

Figure 7:
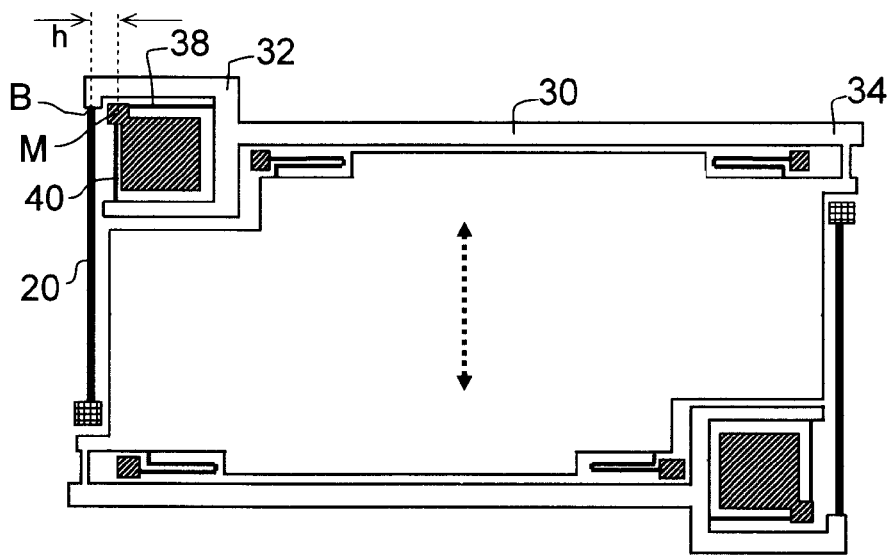
FIG. 7 shows an embodiment in which the resonator is not on the same edge of the seismic mass as the lever arm.

FIG. 7 shows a different configuration from the preceding ones in which the lever arm 30 is located along one side of the seismic mass, essentially perpendicular to the sensitive axis, but the elongate resonator 20 is located along another side perpendicular to the first, hence parallel to the sensitive axis Oy. The operation is the same, and this arrangement may be preferable in some cases in terms of the size requirement as the first side of the mass is already occupied by the lever arm. The anchor point A5 of the resonator is located close to the second side of the mass. The position of the center of rotation is preferably that of FIG. 5, i.e. with a bending arm 38 positioned between the center of rotation M and the end 34 of the lever arm. The arrangements with a recess or with a protrusion on the rigid frame 32 can also be used here.

Figure 8:
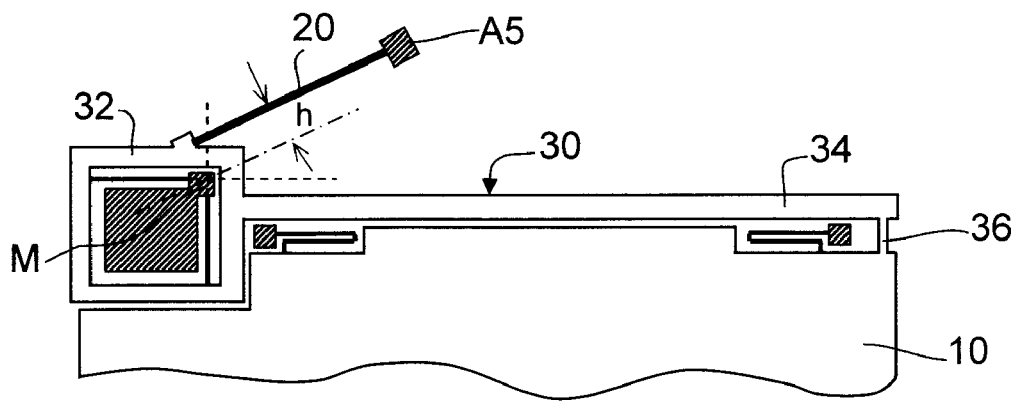
FIG. 8 shows an embodiment in which the resonator makes any angle at all with the sides of the seismic mass and with the lever arm.

FIG. 8 shows a configuration in which the resonant beam 20 is not located along one side of the seismic mass. This configuration has a larger size requirement overall but may be used when it is necessary to provide more space for producing elements for exciting vibration and for reading the vibration frequency around the beam. It can be seen that the structure according to the invention makes it possible to choose any orientation of the resonator, which is an advantage, in particular, for taking account of the constraints in fabricating and in optimizing the space requirement of the device provided with its connector technology. It should also be noted that the lever arm is not necessarily parallel to one side of the seismic mass, although this arrangement is the most advantageous. The lever arm may therefore form any angle whatever with the direction of elongation of the resonator and with the directions Ox and Oy. The most advantageous arrangements in terms of size requirement and lever-arm efficiency are, however, those which have been indicated in the preceding figures, once there is sufficient space to house the excitation and vibration-reading elements.

Figure 9:
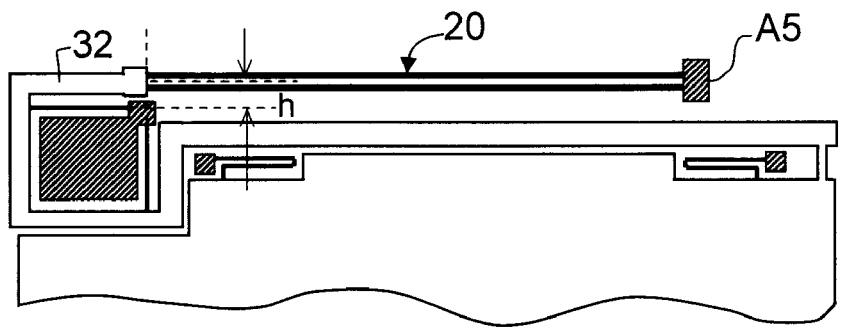
FIG. 9 shows an embodiment in which the resonator is a tuning-fork resonator.

FIG. 9 shows an arrangement inspired by FIG. 3 (though it might also have been inspired by other figures) in which the resonator 20 is a tuning-fork resonator, consisting of two parallel resonant beams close to one another, both being anchored at the anchor point A5 and at the rigid frame 32. It will be noted that it is possible to provide an intermediate part between the rigid frame and the two resonant beams, the beams being fitted to this part and the part being connected to the rigid frame by a hinge or a flexible connection (in the resonator axis) in order to better distribute the force exerted by the lever arm over the two beams. The axis of the resonator, located a distance h from the center of rotation M, is a longitudinal axis passing along the beams, between the latter and at an equal distance from them.

Figure 10:
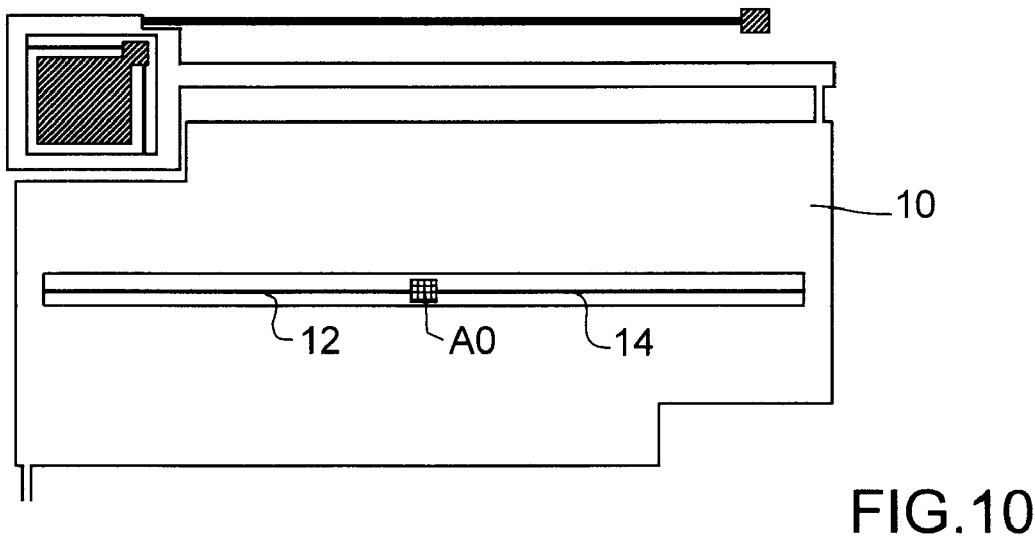
FIG. 10 shows an embodiment in which the seismic mass is suspended by arms situated at the center of the mass rather than at the four corners.

FIG. 10 shows an embodiment in which the seismic mass is suspended from the substrate by its central part and not by its four corners. A single anchor point A0 may suffice in place of the anchors A1, A2, A'1, A'2. The point A0 is located approximately at the center of gravity of the mass, but two anchor points lying on an axis parallel to Ox and passing through the center of gravity may also be suitable. The flexible connecting arms 12 and 14 that support the mass may extend along an axis of symmetry parallel to Ox to provide high stiffness in the Ox direction and low stiffness in the Oy direction. The mass has an elongate central cut-out to allow the arms 12 and 14 to be put there.

In the above, a square rigid frame has been represented, but it may have another shape, for example an open or closed O-shape or a U-shape with branches of the same or different length. It surrounds the center of rotation completely (or partly, if a reduction in its rigidity is accepted) at a distance from the center of rotation M so that it is possible to install two (or more than two) flexible arms of a length providing the desired flexibility.

The rigidity of the lever arm in the direction of bending along the sensitive axis Oy must be much greater than the tensile/compressive rigidity of the resonator so that the tensile/compressive strength of the resonator does not lead to significant bending of the lever arm that is pushed or pulled by the seismic mass.

Sufficient rigidity is essentially reached by providing the bar forming the lever and the rigid frame with sufficient width. Generally, it is necessary for the ratio $4L^3/w^3$ to be sufficiently smaller than the ratio K. (Lr/wr), assuming that the thickness of the lever arm in the Oz direction is equal to the thickness of the resonator. w is the width of the lever arm, wr that of the resonator, Lr is the length of the resonator. K is the amplification ratio for the amplification structure, equal to L/h in the most favorable case.

The structure of the accelerometer may be fabricated by using conventional technologies for micromachining accelerometers on silicon wafers: starting with a Silicon-On-Insulator (SOI) substrate, patterns are produced by photolithography and etching of the silicon that rests on an oxide layer. A metal film is deposited and etched, for example a superposition of chromium and gold, in order to define the electrical connections and the movable parts of the structure are released by removing (by wet etching) the silicon oxide on which these movable parts rest. To this end, the movable parts are pierced with multiple small holes through which the oxide can be evacuated, leaving the movable parts overhanging above the substrate.

Among the advantages of the structure according to the invention it is also possible to indicate that:
 the joint use of a translational mass, of a lever arm and of the rotational articulation is a very modular configuration as it does not fix the relative position of all these elements for proper operation (which might be useful for optimizing the location of the excitation or detection electrodes); in particular it does not fix the position of the center of gravity of the seismic mass;
 one or two resonators may be used for differential or non-differential operation; if the operation is differential, the structure must be symmetric in relation to the center of gravity of the mass; the resonators may be beams or tuning-forks;
 the modularity enables the independence of the sizes of the mass, of the lever arm and of the resonator; the lever arm is, however, advantageously very long and will be connected to the mass at its end in order to favor the amplification;
 the lever arm will advantageously be located along the seismic mass and the resonator along the lever arm in order to optimize the size requirement;
 the articulation proposed makes it possible to locate the resonator at the desired angle and to know precisely the location of the center of rotation; the distance from this center to the resonator is known and may be the smallest possible, which favors the amplification;
 the behavior of this articulation does not rest on the quality of fabrication of the flexible hinges, but is based on beams that are easy to fabricate;
 the architecture uses only a single flexible hinge and its performance does not depend on the latter to first order;
 one end of each resonator is anchored to the substrate and the other is connected to a rigid frame, which favors a good quality factor;
 in the case of differential use, the two resonators are not directly connected by a mechanical part and it is very difficult for the elastic waves produced by one to reach the other; coupling phenomena are minimized and the dead zones are limited;
 as the mass is suspended from the substrate by anchors, these anchors may serve as a stop, limiting the movement of the mass in the case of impact in any direction, thus avoiding destruction of the sensor.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A micromachined accelerometer using a movable seismic mass suspended in relation to a substrate by elastic connections principally allowing translation in its own plane along a sensitive axis (Oy), the mass acting on at least one elongate resonator by means of a force amplification structure associated with this resonator, the amplification structure comprising a rigid lever arm, a first end of which is connected to the seismic mass by a connection having, in the plane of the mass, a high stiffness in the direction of the sensitive axis (Oy) and a low stiffness in the perpendicular direction, and a second end of which is connected to an anchor point on the substrate, wherein the second end of the lever arm is a rigid piece connected to the anchor point by a purely rotational connection about a center of rotation, the resonator having one end fixed to the rigid piece at a point such that the longitudinal axis of the resonator passes a distance h, small in relation to the length L of the lever arm but nonzero, from the center of rotation of the rotational connection.

2. The accelerometer as claimed in claim 1, wherein the rigid piece at the second end of the lever arm surrounds the anchor point.

3. The accelerometer as claimed in claim 2, wherein the resonator is arranged along one side of the seismic mass and in immediate proximity to this side.

4. The accelerometer as claimed in claim 2, wherein the rotational connection between the rigid piece of the lever arm and the anchor point consists of at least two flexible bending arms having different orientations, attached at points very close to one another on the anchor point and furthermore attached to the rigid piece.

5. The accelerometer as claimed in claim 2, wherein the rigid piece consists of a closed or partly open rectangular frame.

6. The accelerometer as claimed in claim 2, wherein the point of attachment of the resonator on the rigid piece is situated at a point of the piece such that the angle formed between the line that connects the attachment point to the center of rotation, on the one hand, and the longitudinal direction of the resonator, on the other hand, is close to 90°.

7. The accelerometer as claimed in claim 2, wherein the resonator is a simple elongate resonant beam or an assembly of two mechanically coupled parallel resonant beams.

8. The accelerometer as claimed in claim 2, wherein the resonator has one end attached to an anchor point on the substrate.

9. The accelerometer as claimed in claim 2, comprising two symmetric lever arms driven to move rotationally in opposite directions when the seismic mass moves along the sensitive axis, and wherein the resonator has two ends, each attached to the rigid piece of a respective lever arm.

10. The accelerometer as claimed in claim 1, wherein the resonator is arranged along one side of the seismic mass and in immediate proximity to this side.

11. The accelerometer as claimed in claim 1, wherein the lever arm is placed along one side of the seismic mass perpendicular to the sensitive axis (Oy).

12. The accelerometer as claimed in claim 1, wherein the rotational connection between the rigid piece of the lever arm and the anchor point consists of at least two flexible bending arms having different orientations, attached at points very close to one another on the anchor point and furthermore attached to the rigid piece.

13. The accelerometer as claimed in claim 12, wherein the center of rotation is situated between the second end of the lever arm and one of the flexible bending arms.

14. The accelerometer as claimed in claim 12, wherein one of the flexible bending arms of the rotational connection is located between the center of rotation and the second end of the lever arm.

15. The accelerometer as claimed in claim 1, wherein the rigid piece consists of a closed or partly open rectangular frame.

16. The accelerometer as claimed in claim 1, wherein the point of attachment of the resonator on the rigid piece is situated at a point of the piece such that the angle formed between the line that connects the attachment point to the center of rotation, on the one hand, and the longitudinal direction of the resonator, on the other hand, is close to 90°.

17. The accelerometer as claimed in claim 1, wherein the resonator is a simple elongate resonant beam or an assembly of two mechanically coupled parallel resonant beams.

18. The accelerometer as claimed in claim 1, wherein the resonator has one end attached to an anchor point on the substrate.

19. The accelerometer as claimed in claim 1, comprising two symmetric lever arms driven to move rotationally in opposite directions when the seismic mass moves along the sensitive axis, and wherein the resonator has two ends, each attached to the rigid piece of a respective lever arm.

20. The accelerometer as claimed in claim 19, wherein the two symmetric lever arms are arranged in line with each other along one edge of the seismic mass, their second ends being connected to the seismic mass by a respective flexible connection close to the middle of the edge of the mass, the resonator being positioned parallel to the two arms.

21. The accelerometer as claimed in claim 1, comprising at least two resonators arranged symmetrically in relation to the center of gravity of the seismic mass, and two force amplification structures, each associated with a respective resonator and symmetric in relation to the center of gravity.

\* \* \* \* \*